United States Patent
Miyauti et al.

[11] Patent Number: 5,929,192
[45] Date of Patent: Jul. 27, 1999

[54] PROCESS FOR PRODUCING AROMATIC POLYCARBONATE RESIN

[75] Inventors: Tetsurou Miyauti; Toru Wawaki; Katsushi Sasaki, all of Iwakuni, Japan

[73] Assignee: Teijin Limited, Osaka, Japan

[21] Appl. No.: 08/973,394

[22] PCT Filed: Apr. 4, 1997

[86] PCT No.: PCT/JP97/01172

§ 371 Date: Dec. 11, 1997

§ 102(e) Date: Dec. 11, 1997

[87] PCT Pub. No.: WO97/38039

PCT Pub. Date: Oct. 16, 1997

[30] Foreign Application Priority Data

Apr. 11, 1996 [JP] Japan .................................. 8-89365

[51] Int. Cl.⁶ .................................................. C08G 64/00
[52] U.S. Cl. .................................................. 528/196
[58] Field of Search ....................................... 528/196

[56] References Cited

U.S. PATENT DOCUMENTS 5,444,148  8/1995  Alewelt et al. ........................ 528/196

OTHER PUBLICATIONS

Patent Abstract of JP 06 065 367, Mar. 8, 1994.

*Primary Examiner*—Terressa Mosley
*Attorney, Agent, or Firm*—Foley & Lardner

[57] ABSTRACT

A process for producing an aromatic polycarbonate resin by melt polycondensing an aromatic dihydroxy compound and an aromatic carbonic acid diester, wherein a mixture solution comprising the same aromatic monohydroxy compound as a aromatic monohydroxy compound by-produced from a reaction system as a main component and a freezing-point depressant for the aromatic monohydroxy compound, such as a glycol, is used as a scrubbing solution for the recovery of the by-produced aromatic monohydroxy compound by a scrubber type condenser.

7 Claims, 1 Drawing Sheet

PROCESS FOR PRODUCING AROMATIC POLYCARBONATE RESIN

FIELD OF THE INVENTION

This invention relates to a process for producing an aromatic polycarbonate resin and, more specifically, to a process for producing an aromatic polycarbonate resin, which comprises the step of melt polycondensing an aromatic dihydroxy compound and an aromatic carbonic acid diester and which allows continuous operation to be performed on an industrial scale for a prolonged period of time.

PRIOR ART

Aromatic polycarbonate resins have excellent mechanical properties such as impact resistance as well as excellent heat resistance and transparency, and are widely used as a molding material. Such aromatic polycarbonate resins are produced by known methods including an interfacial method in which an aromatic dihydroxy compound such as bisphenol is allowed to react directly with phosgene; and a melt polycondensation method in which an aromatic dihydroxy compound such as bisphenol and an aromatic carbonic acid diester such as diphenyl carbonate are subjected to an ester exchange reaction in a molten state.

Of these production methods, the method of producing a polycarbonate by subjecting an aromatic dihydroxy compound and an aromatic carbonic acid diester to an ester exchange reaction is one in which an aromatic dihydroxy compound and an aromatic carbonic acid diester are heated up to 250 to 330° C. to melt and subjected to an ester exchange reaction, in a molten state, at a reduced pressure in the presence of a catalyst such as an organic acid salt, inorganic acid salt, hydroxide, hydride or alcoholate of a metal.

In this ester exchange reaction, the operation of recovering the vapor of an aromatic monohydroxy compound as a by-product by a condenser is required and a scrubber type condenser which uses a cooled aromatic monohydroxy compound as a scrubbing solution is usable as the condenser. However, since the freezing point of the aromatic monohydroxy compound is high, the temperature of the scrubbing solution cannot be sufficiently lowered, whereby the recovery efficiency is low and it is difficult to maintain a degree of reduced pressure required for the reaction.

To solve the above problems, JP-A 6-065367 (the term "JP-A" as used herein means an "unexamined published Japanese patent application") proposes a process which uses a high-boiling and low-melting compound other than the by-produced aromatic monohydroxy compound as a scrubbing solution. This publication lists tetraethylene glycol, dibenzyl toluene and mono- or dialkyl-substituted diphenyl ether in which the alkyl group has 8 to 18 carbon atoms as specific examples of the compound used as the scrubbing solution.

However, in this process, the scrubbing solution must be recycled after separating the by-produced aromatic monohydroxy compound from a large amount of the scrubbing solution. And, generally, the scrubbing solution must be recycled in an amount of hundreds times the quantity of the by-produced aromatic composition in order to achieve sufficient scrubbing. Consequently, this process invites increases in equipment costs and energy load, which are industrially disadvantageous.

Further, it cannot be said that the above process is suitable for a long-time continuous operation when it is carried out on an industrial scale. In other words, the above process makes impossible a long-time stable operation because unreacted products and oligomers contained in the vapor of the aromatic monohydroxy compound discharged from the reaction system are solidified, accumulated in the scrubber and deposited in a bottom portion of the scrubber, thereby clogging up an exhaust line. The solidification of the unreacted product and the oligomer in the scrubber is considered to depend on the composition and solubility of the scrubbing solution. The above publication describes that such solidification occurs in the scrubber in the above process (page 3, column 3, lines 36–40) and further that the line in the bottom portion of the scrubber began to get clogged after 7 days of continuous operation in Examples (page 4, column 6, lines 30–40).

SUMMARY OF THE INVENTION

It is therefore a first object of the present invention to provide a process which uses a scrubber type condenser having excellent recovery efficiency and a scrubbing solution essentially composed of an aromatic monohydroxy compound in the steps of solidifying and recovering the vapor of the aromatic monohydroxy compound discharged from the reaction system in the melt polycondensation method.

It is a second object of the present invention to provide a production process of an aromatic polycarbonate resin which allows a long-time stable operation to be done because an unreacted product and oligomer contained in the vapor are not solidified in recovering the vapor of the aromatic monohydroxy compound in the melt polycondensation method.

It is a third object of the present invention to provide a production process of an aromatic polycarbonate resin which makes it possible to reduce equipment costs and operation energy costs for the recycling of the scrubbing solution for the recovery of the vapor of the aromatic monohydroxy compound in the melt polycondensation method.

According to studies conducted by the inventors of the present invention, it was found that the above objects of the present invention can be attained by a process for producing an aromatic polycarbonate resin by melt polycondensing an aromatic dihydroxy compound and an aromatic carbonic acid diester, wherein a mixture solution containing the same aromatic monohydroxy compound as an aromatic monohydroxy compound by-produced from a reaction system as a main component and a freezing-point depressant for the aromatic monohydroxy compound is used as a scrubbing solution for the recovery of the aromatic monohydroxy compound by-produced from the reaction system by a scrubber type condenser.

DETAILED DESCRIPTION OF THE INVENTION

Figure 1:
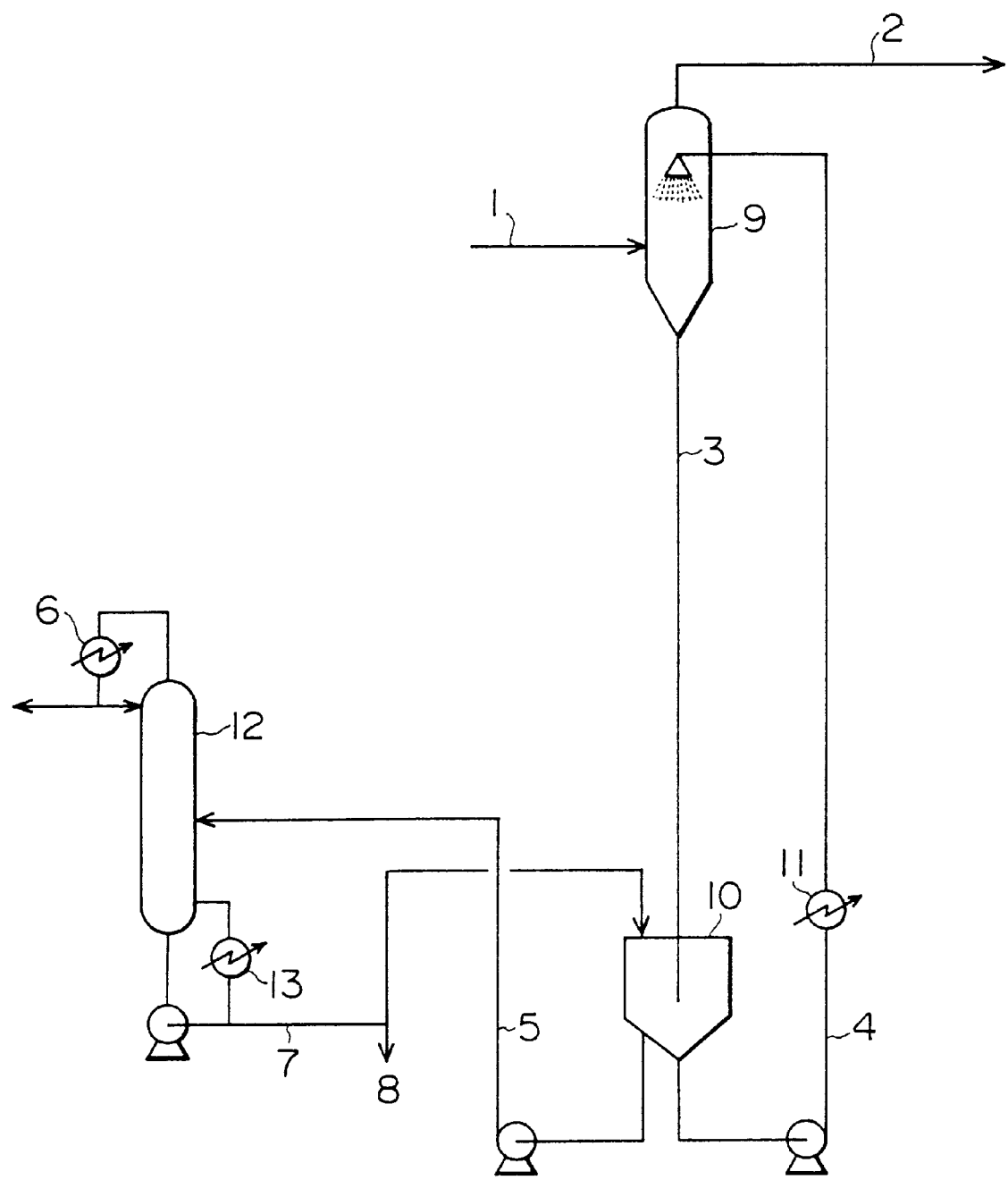

The present invention is described in detail hereinafter.

The aromatic polycarbonate resin of the present invention is produced by the melt polycondensation method. One of starting materials used in the method is an aromatic dihydroxy compound. Illustrative examples of the aromatic dihydroxy compound include bis(4-hydroxyphenyl) methane, 2,2-bis(4-hydroxyphenyl)propane[bisphenol A], 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)oxide, bis(3, 5-dichloro-4-hydroxyphenyl)oxide, p,p'-dihydroxydiphenyl, 3,3'-dichloro-4,4'-dihydroxydiphenyl, bis(4-hydroxyphenyl)sulfone, bis(3,5-dimethyl-4-hydroxyphenyl) sulfone, dihydroxybenzene, resorcinol, hydroquinone, 1,4-dihydroxy-2,5-dichlorobenzene, 1,4-dihydroxy-3-methylbenzene, bis(4-hydroxyphenyl)sulfide, bis(4-hydroxyphenyl)sulfoxide and the like. Of these, bis (hydroxyaryl)alkanes such as 2,2-bis(4-hydroxyphenyl) propane are particularly preferred.

Illustrative examples of the aromatic carbonic acid diester used as the other starting material include diphenyl carbonate, dinaphthyl carbonate and bis(diphenyl) carbonate, of which diphenyl carbonate is particularly preferred.

Generally, the melt polycondensation reaction is carried out by stirring, while heating, the aromatic dihydroxy compound and the aromatic carbonic acid diester under reduced pressure (in an nitrogen atmosphere) and distilling off the by-produced aromatic monohydroxy compound.

To increase the polymerization rate, a catalyst may be used. Illustrative examples of the catalyst include hydroxides of alkali metals and alkali earth metals such as sodium hydroxide and potassium hydroxide; alkali metal salts, alkali earth metal salts and quaternary ammonium salts of hydroxides of boron and aluminum; alkoxides of alkali metals and alkali earth metals; organic acid salts of alkali metals and alkali earth metals; zinc compounds; boron compounds; silicon compounds; germanium compounds; organic tin compounds; lead compounds; onium compounds; antimony compounds; manganese compounds; titanium compounds; zirconium compounds; and the like, all of which are generally used in an esterification reaction and ester exchange reaction. However, the catalyst is not limited to these. The above substances may be used alone or in combination of two or more. The amount of the catalyst is $10^{-8}$ to $10^{-3}$ moles, preferably $10^{-7}$ to $5\times10^{-4}$ moles, more preferably $5\times10^{-7}$ to $2\times10^{-4}$ moles per 1 mole of the aromatic dihydroxy compound as a starting material.

In the above process of producing an aromatic polycarbonate resin by the melt polycondensation method according to the present invention, the polycondensation reaction is carried out while the by-produced aromatic monohydroxy compound is discharged to the outside of the reaction system in the form of vapor. The vapor of the aromatic monohydroxy compound discharged to the outside of the reaction system is recovered in a scrubber type condenser.

The present invention is advantageously applied when the discharged vapor of the aromatic monohydroxy compound is sucked and recovered at a reduced pressure of not higher than 1,000 Pa, preferably not higher than 500 Pa. When the scrubber type condenser is operated at such a highly reduced pressure, the temperature of the scrubbing solution needs to be 10 to 50° C., preferably 20 to 30° C. At such a low temperature, the recovered aromatic monohydroxy compound is solidified, making difficult continuous operation.

However, in the present invention, the solidification of the recovered aromatic monohydroxy compound can be prevented by using the aromatic monohydroxy compound containing a freezing-point depressant as the scrubbing solution, thus making possible not only stable continuous operation but also the handling of an unreacted product and an oligomer discharged to the outside of the reaction system together with the vapor of the aromatic monohydroxy compound in a molten state and in a form not solidified. Therefore, according to the present invention, the operation of the scrubber type condenser can be carried out continuously and stably for a prolonged time.

The scrubbing solution used in the scrubber type condenser of the present invention is a mixture solution containing the same aromatic monohydroxy compound as the aromatic monohydroxy compound by-produced from the reaction system as a main component and a freezing-point depressant. The content of the freezing-point depressant is in the range of 0.5 to 50% by weight, preferably 1 to 30% by weight, based on the scrubbing solution.

When the proportion of the freezing-point depressant added is less than 0.5% by weight of the scrubbing solution, the freezing point of the scrubbing solution cannot be sufficiently lowered and in consequence, the scrubbing solution is liable to solidify. When the proportion of the freezing-point depressant is more than 50% by weight, disadvantageously, costs required for the recovery and recycling of the freezing-point depressant grow and clogging is liable to occur due to reduction in solubility of the oligomer.

The scrubbing solution contains the aromatic monohydroxy compound as a main component in a proportion of 50 to 99.5% by weight, preferably 70 to 99% by weight.

It is advantageous that the freezing-point depressant contained in the scrubbing solution preferably has a boiling point of not lower than 190° C., more preferably 210 to 350° C., particularly preferably 220 to 300° C., under normal pressure, in view of the operation pressure of the scrubber type condenser and the recycling of the scrubbing solution by a distillation operation.

The freezing-point depressant can be a glycol represented by the following general formula (1).

$$\text{HO}-(\text{R}-\text{O})_n-\text{H} \qquad (1)$$

wherein R is $-C_2H_4-$ or $-C_3H_6-$ (which may be either $-CHCH_3-CH_2-$ or $-CH_2CH_2CH_2-$) and n is an integer of 1 to 5.

Illustrative examples of the glycol include diethylene glycol, triethylene glycol, tetraethylene glycol, hexaethylene glycol, propylene glycol, trimethylene glycol and dipropylene glycol. Of these, diethylene glycol, triethylene glycol and a mixture thereof are preferred.

In the present invention, the above freezing-point depressants may be used alone or in combination of two or more. When only one freezing-point depressant is used, triethylene glycol is the most preferred. When a plurality of freezing-point depressants are used in combination, the total weight of the freezing-point depressants needs to be within the above range.

The aromatic monohydroxy compound used in the scrubbing solution in the present invention is the same as the by-produced aromatic monohydroxy compound. The by-produced aromatic monohydroxy compound, which differs depending on the aromatic carbonic acid diester used, is phenol when diphenyl carbonate is used, naphthol when dinaphthyl carbonate is used and phenyl phenol when bis (diphenyl)carbonate is used.

As the scrubber type condenser used in the present invention may be used various types of condensers such as a spray tower, wet wall tower, cyclone scrubber, Venturi scrubber and the like, of which a spray tower is preferred. As far as the above-mentioned scrubbing solution is used, the present invention can be carried out in various types of condensers.

Methods for controlling and adjusting the concentrations of the aromatic monohydroxy compound and the freezing-point depressant contained in the scrubbing solution in the present invention include a method in which the freezing-point depressant is continuously added to the scrubbing solution to keep constant the concentration thereof; a method in which the freezing-point depressant is intermittently added to the scrubbing solution to keep the concentration thereof in a specific range; and the like. The method used in the present invention is not particularly limited. However, whichever method is used, it is necessary to keep the concentrations of the aromatic monohydroxy compound and the freezing-point depressant within the above ranges.

The scrubbing solution is operated at 10 to 50° C., preferably 20 to 30° C. When the temperature of the scrubbing solution is lower than 10° C., the aromatic monohydroxy compound contained in the scrubbing solution will separate out unless the amount of the freezing-point depressant is increased, whereby the clogging of a spray or the like will readily occur. When the temperature of the scrubbing solution exceeds 50° C., it will be difficult to maintain the degree of reduced pressure in the system and the recovery efficiency will lower.

When the degree of reduced pressure in the condenser is generally not more than 1,000 Pa, preferably not more than 500 Pa, the melting point and boiling point of the aromatic monohydroxy compound become close to each other and the freezing point of the scrubbing solution can be reduced advantageously. The degree of reduced pressure is particularly preferably not more than 300 Pa.

When a post-treatment is made on the scrubbing solution taken out from the bottom portion of the condenser, such means as purification-separation and scrapping of the whole amount are conceivable. Any method can be used without restrictions on the present invention. Purification-separation means include distillation, crystallization and the like and scrapping means include combustion and the like. Whichever post-treatment is made, it is important to reduce costs and energy load. Since the amount of the freezing-point depressant used is small in the present invention, it is possible to minimize the costs.

A preferred post-treatment of the scrubbing solution is described with reference to FIG. 1.

Phenol vapor generated from the polymerization reactor is introduced into a scrubber type condenser 9 through a line 1. In the scrubber type condenser 9, a scrubber solution cooled in a cooler 11 is sprayed from a spray nozzle and makes contact with the phenol vapor so that the phenol is condensed and absorbed by the scrubber solution. The scrubber solution passes through a line 3 from a lower portion of the condenser 9 and is recovered in a scrubber solution storage tank 10, The scrubber solution is circulated through a line 4 and the cooler 11 by a pump. To prevent the composition of the scrubber solution from being changed by the accumulation of the phenol, part of the scrubber solution is continuously supplied into a fractionating column 12 through a line 5. Reference numeral 6 denotes a condenser.

In the fractionating column 12, the phenol is recovered from a top portion of the column and the scrubber solution is recovered from a bottom portion of the column. After the scrubber solution is cooled as required, it is returned to the scrubber solution storage tank 10 through a line 7. High-boiling substances are purged off from the bottom of the column through a line 8 when they have the concentration exceeding the predetermined value. Reference numeral 13 denotes a heater. When the recovery operation is a batch operation, it can be carried out with ease by providing a buffer tank in the lines 5 and 7.

Effect of the Invention

According to the present invention, by use of a scrubber type condenser which uses, as a scrubbing solution, an aromatic monohydroxy compound containing a freezing-point depressant, there is provided an industrially advantageous production process of a polycarbonate resin. That is, the present invention makes it possible to recover the aromatic monohydroxy compound by-produced in the above production process at an extremely high efficiency, enables the condenser to maintain a high degree of reduced pressure and carry out a long-time stable operation with a small thermal load and allows the recovery of an aromatic monohydroxy compound at an extremely reduced energy cost.

EXAMPLES

The following Examples and Comparative Examples are given to further illustrate the present invention. "%" in the Examples and Comparative Examples indicate "% by weight" unless otherwise specified. The viscosity average molecular weight is obtained from the following equation by measuring the intrinsic viscosity of 0.7 g/dl of a methylene chloride solution using an Ubbelohde's viscometer.

$$[\eta]=1.23\times10^{-4}\,M^{0.83}$$

Example 1

A reaction was carried out by continuously supplying a molten mixture of 2,2-bis(4-hydroxyphenyl)propane (bisphenol A), 1.05 moles of diphenyl carbonate, $2\times10^{-6}$ equivalent of a bisphenol A disodium salt and $1\times10^{-4}$ equivalent of tetramethyl ammonium hydroxide based on 1 mole of the former compound to a vertical stirring tank equipped with a fractionating column, and removing a by-produced phenol from the fractionating column while the reaction temperature and the degree of reduced pressure were respectively maintained at 200° C. and 100 mmHg (13,300 Pa).

A reaction was carried out by continuously supplying the molten polymer discharged from the vertical reaction tank to a second vertical stirring tank equipped with a fractionating column and removing a by-produced phenol from the fractionating column while the reaction temperature and the degree of reduced pressure were respectively maintained at 270° C. and 10 mmHg (1,330 Pa).

The molten polymer discharged from the second vertical reaction tank was further continuously supplied to a horizontal reaction tank equipped with a scrubber type condenser and a stirrer which was operated for 2 weeks while the reaction temperature and the degree of reduced pressure were maintained at 290° C. and 1 mmHg (133 Pa), respectively.

Phenol vapor by-produced in the horizontal reaction tank was recovered by the scrubber type condenser with the composition of the scrubbing solution and under operation conditions shown in Table 1.

During operation, part of the scrubbing solution was extracted periodically and ethylene glycol as a freezing-point depressant was supplied to adjust the concentration of ethylene glycol contained in the scrubbing solution to 20 to 25%.

During 2 weeks of operation, changes in the degree of reduced pressure were not observed and a polycarbonate resin having a viscosity average molecular weight of 22,500 was obtained from the outlet of the horizontal reaction tank stably.

After operation, when the horizontal reaction tank and the reduced pressure/recovery system of the reaction tank were dismantled and inspected, no clogged portion was observed.

Operation results are shown in Table 1.

Example 2

A reaction was carried out in the same manner as in Example 1 except that triethylene glycol was used as a freezing-point depressant to be added to the scrubber solution used in the scrubber type condenser of the horizontal reaction tank.

During two weeks of operation, changes in the degree of reduced pressure were not observed and a polycarbonate resin having a viscosity average molecular weight of 22,500 was obtained from the outlet of the horizontal reaction tank stably.

After operation, when the horizontal reaction tank and the recovery system of the reaction tank were dismantled and inspected, no clogged portion was observed.

Operation results are shown in Table 1 together with those of Example 1.

Comparative Example 1

When a reaction was to be carried out in the same manner as in Examples 1 and 2 except that no freezing-point depressant was added to the scrubber solution in the scrubber type condenser of the horizontal reaction tank and pure phenol heated at 45° C. was used as the scrubbing solution, the degree of reduced pressure of the horizontal reaction tank could not be maintained at 1.7 mmHg (226 Pa) or lower and by-produced phenol could not be recovered. Therefore, continuous operation was stopped after 20 hours.

After operation, when the horizontal reaction tank and the recovery system were dismantled and inspected, a line extending from the scrubber type condenser to the vacuum pump was clogged up with the crystals of the by-produced phenol.

Operations results are shown in Table 1 together with those of Examples 1 and 2.

Comparative Example 2

A reaction was carried out in the same manner as in Examples 1 and 2 except that ethylene glycol was used as the scrubber solution in the scrubber type condenser of the horizontal reaction tank.

During 2 weeks of operation, changes in the degree of reduced pressure were not observed and a polycarbonate resin having an average molecular weight of 22,500 was obtained from the outlet of the reaction device stably.

Operation results are shown in Table 1 together with those of Examples 1 and 2 and Comparative Example 1.

TABLE 1

| | Composition of scrubbing solution | | Operation conditions | | Operation results | | |
|---|---|---|---|---|---|---|---|
| | Phenol (wt %) | Freezing-point depressant (wt %) | Temperature of scrubbing solution (°C.) | Degree of reduced pressure (mmHg) [Pa] | Amount of freezing-point depressant (kg/hr) | Recovery rate of phenol (%) | Clogging of vapor line |
| Ex. 1 | 75 ~ 80 | Ethylene glycol 20 ~ 25 | 20 | 1.0 [133] No change | 0.1 | 98.4 | No |
| Ex. 2 | 75 ~ 80 | Triethylene glycol 20 ~ 25 | 20 | 1.0 [133] No change | 0.1 | 99.8 | No |
| Comp. Ex. 1 | 100 | Not used | 45 | 1.7 [225] Changed along with passage of time | 0.0 | 0.00 Could not be recovered | Vacuum line was clogged up |
| Comp. Ex. 2 | 0 ~ 5 | Ethylene glycol 95 ~ 100 | 20 | 1.0 [133] No change | 7.6 Large | 99.4 | No |

Ex.: Example
Comp. Ex.: Comparative Example

Example 3 and Comparative Example 3

A molten mixture containing bisphenol A and 1.02 mole of diphenyl carbonate based on 1 mole of the bisphenol A as a starting material and a solution of 0.01% by weight of a bisphenol A disodium salt and 0.35% by weight of tetramethyl ammonium hydroxide dissolved in phenol containing 10% by weight of water as a catalyst were prepared and supplied continuously to a first polymerization reactor by a quantity measuring pump to ensure that the amount of the bisphenol A disodium salt was $2 \times 10^{-6}$ equivalent based on 1 mole of bisphenol A. The first polymerization reactor was a vertical stirring tank equipped with a fractionating column for separating phenol generated by polymerization and the generated phenol was liquefied and recovered by a multi-tubular type condenser which 50° C. hot water ran through. Part of the phenol was returned to a top portion of the fractionating column as a reflux solution and the rest of the phenol was taken out to the outside of the system. A polymer having an extremely low degree of polymerization, which is formed in the first polymerization reactor maintained at 200° C. and 100 mmHg (13,300 Pa), was extracted from the first polymerization reactor and supplied continuously to a second polymerization reactor. The second polymerization reactor had the same function as the first polymerization reactor and was maintained at 250° C. and 10 mmHg (1,330 Pa) to further carry out polymerization. Thereafter, the obtained polymer was continuously taken out and supplied to a third polymerization reactor. The third polymerization reactor was a horizontal single-screw stirring tank maintained at 270° C. and 1 mmHg (133 Pa). Generated phenol was directly introduced into the scrubber type condenser, contacted with the scrubbing solution to be recovered, and removed from the system. A polymer generated in the third polymerization reactor was further supplied to a fourth polymerization reactor continuously where polymerization was carried out until a target degree of polymerization was obtained.

The fourth polymerization reactor was a horizontal twin-screw stirring tank maintained at 280° C. and 1 mmHg (133 Pa) to stir even a high-viscosity polymer. Generated phenol was directly introduced into the scrubber type condenser and recovered in the same manner as in the third polymerization reactor.

The viscosity average molecular weight of a polymer from the fourth polymerization reactor was set to 22,500 and phenol (PhOH) containing 20% by weight of triethylene glycol (TEG) or tetraethylene glycol was used as the scrubber solution to carry out scrubbing. After the scrubber solution was cooled to 20° C., it was circulated through the scrubber type condenser, and polymerization was continuously carried out for two weeks while phenol formed by polymerization was recovered. Phenol vapors generated from the third polymerization reactor and the fourth polymerization reactor were introduced into the scrubber type condenser. The results are shown in Table 2 below.

TABLE 2

| | Composition of scrubber solution | Operation period | Clogging of vapor line | Clogging of liquid line |
|---|---|---|---|---|
| Ex. 3 | PhOH/TEG = 8/2 | Two weeks | No | No |
| Comp. Ex. 3 | Tetraethylene glycol | One week | No | Slightly clogged in about one week |

Ex.: Example
Comp. Ex.: Comparative Example

To study the cause of the difference of clogging, a test for the solubility of an oligomer in the scrubber solution was made. The results shown in Table 3 below were obtained.

TABLE 3

| Composition of scrubber solution | Results of solubility test |
|---|---|
| PhOH/TEG = 8/2 | Dissolved not less than 1.0 wt % of oligomer |
| Tetraethylene glycol | Dissolved only 0.2 wt % of oligomer |

When phenol containing 20% of triethylene glycol as a freezing-point depressant was used as the scrubber solution, it has been found that it dissolves many oligomers. Therefore, it is considered that this makes it difficult to clog lines.

We claim:

1. A process for producing an aromatic polycarbonate resin comprising:

melt polycondensing an aromatic dihydroxy compound and an aromatic carbonic acid diester, wherein a mixture solution comprising the same aromatic monohydroxy compound as a aromatic monohydroxy compound by-produced from a reaction system as a main component and a freezing-point depressant for the aromatic monohydroxy compound are used as a scrubbing solution for the recovery of the by-produced aromatic monohydroxy compound by a scrubber condenser.

2. The process of claim 1, wherein the recovery of the aromatic monohydroxy compound by-produced from the reaction system is carried out at a reduced pressure of not higher than 1,000 Pa.

3. The process of claim 1, wherein the freezing-point depressant has a boiling point of not lower than 190° C. under a normal pressure.

4. The process of claim 1, wherein the scrubbing solution contains the aromatic monohydroxy compound in a proportion of 50 to 99.5% by weight and the freezing-point depressant in a proportion of 0.5 to 50% by weight.

5. The process of claim 1, wherein the scrubbing solution contains the aromatic monohydroxy compound in a proportion of 70 to 99% by weight and the freezing-point depressant in a proportion of 1 to 30% by weight.

6. The process of claim 1, wherein the freezing-point depressant is a compound represented by the following general formula (1):

$$HO-(R-O)_n-H \tag{1}$$

wherein R is $-C_2H_4-$ or $-C_3H_6-$ and n is an integer of 1 to 5.

7. The process of claim 1, wherein the freezing-point depressant is diethylene glycol, triethylene glycol or a mixture of these.

* * * * *

UNITED STATES PATENT AND TRADEMARK OFFICE
CERTIFICATE OF CORRECTION

PATENT NO. : 5,929,192
DATED : July 27, 1999
INVENTOR(S) : Tetsurou MIYAUTI et al.

It is certified that error appears in the above-identified patent and that said Letters Patent is hereby corrected as shown below:

On the title page, item [75] Inventors: "Toru Wawaki" should read --Toru Sawaki --.

Signed and Sealed this

Twenty-sixth Day of September, 2000

Attest:

Q. TODD DICKINSON

*Attesting Officer*    *Director of Patents and Trademarks*